United States Patent [19]
Merkler et al.

[11] Patent Number: 6,092,813
[45] Date of Patent: Jul. 25, 2000

[54] SEALING RING AT AXLE SHAFT FLANGE FOR A VEHICLE

[75] Inventors: Michael B. Merkler, Fort Wayne; Chester D. Smith, Monroeville; Allen P. Scott; Daniel R. Daley, both of Fort Wayne, all of Ind.

[73] Assignee: Navistar International Transportation Corp, Chicago, Ill.

[21] Appl. No.: 09/024,838

[22] Filed: Feb. 17, 1998

[51] Int. Cl.[7] ............................................. F16J 15/10
[52] U.S. Cl. ...................................................... 277/644
[58] Field of Search .................................. 277/606, 616, 277/626, 627, 621, 624

[56] References Cited

U.S. PATENT DOCUMENTS

| | | | |
|---|---|---|---|
| 671,697 | 4/1901 | Hammon | 277/626 |
| 720,655 | 2/1903 | Bard | 277/626 X |
| 2,639,204 | 5/1953 | Terry | 384/477 |
| 3,048,241 | 8/1962 | Kelley | 188/71.9 |
| 4,049,281 | 9/1977 | Bainard . | |
| 4,210,220 | 7/1980 | Balter | 180/339 |
| 4,502,698 | 3/1985 | Collions . | |
| 5,032,029 | 7/1991 | Pratt et al. | 384/585 |
| 5,112,066 | 5/1992 | Remmerfelt | 277/606 X |
| 5,190,355 | 3/1993 | Hobbie et al. | 301/105.1 |
| 5,421,591 | 6/1995 | Katzensteiner . | |
| 5,560,619 | 10/1996 | Acree | 277/637 |

*Primary Examiner*—Anthony Knight
*Assistant Examiner*—Vismal Patel
*Attorney, Agent, or Firm*—Jeffrey P. Calfa; Dennis Kelly Sullivan

[57] ABSTRACT

A sealing ring for a drive axle for a mobile vehicle such as a medium or heavy duty truck. The sealing ring is for the interface between the shaft end flange of the axle and the outer hub mounting face of the wheel hub which allows for metal to metal contact between shaft end flange and the wheel hub mounting faces. The sealing ring has a shaft side which is compressed upon installation into a recess in the shaft end flange of the axle and the sealing ring has a hub side which fits adjacent to an inner radial wall of the wheel hub to seal lubricant in the cavity of the wheel hub. The sealing ring is resistant to tearing during installation.

10 Claims, 5 Drawing Sheets

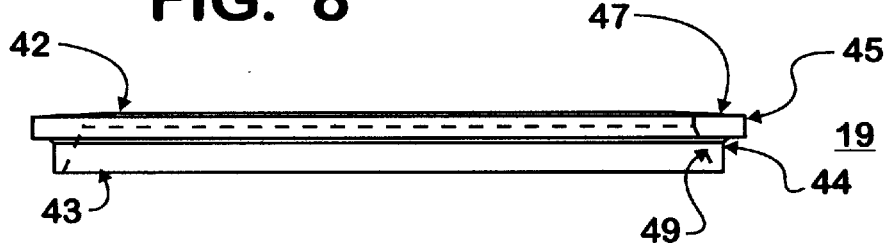
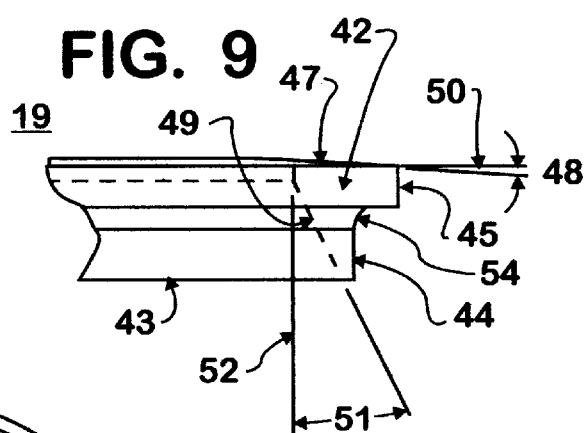
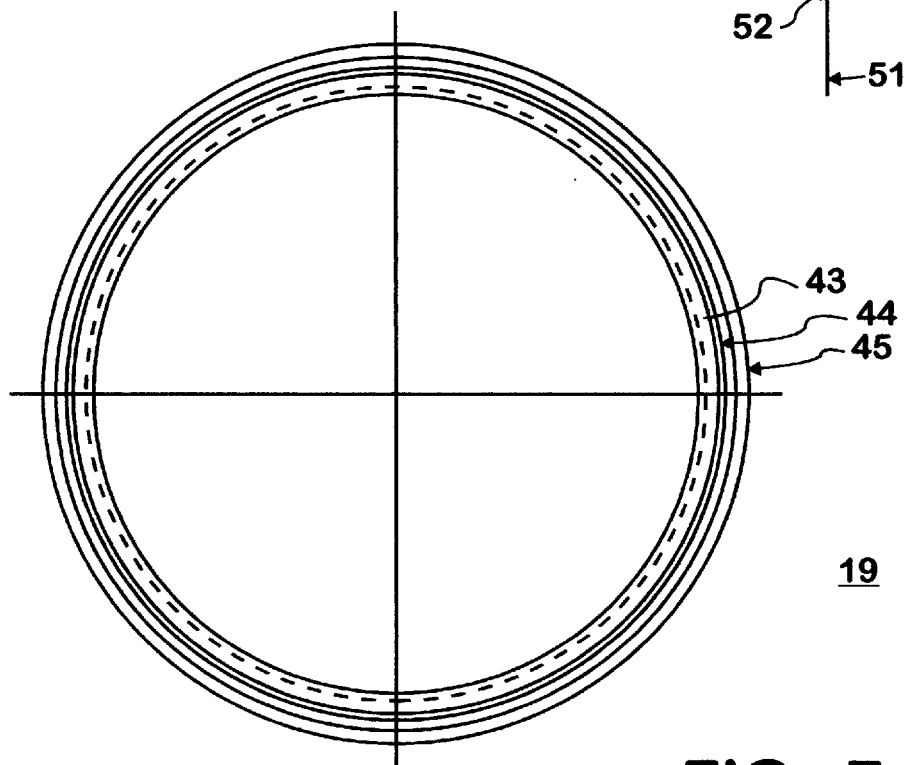

SEALING RING AT AXLE SHAFT FLANGE FOR A VEHICLE

BACKGROUND OF THE INVENTION

The present invention relates to an improved sealing ring for use at the shaft end flange between the axle shaft and the wheel hub of the drive axles of mobile vehicles such as medium and heavy trucks. The wheel hub cavity contains lubricant for bearings within the hub. This invention will prevent this lubricant from leaking out as well as easing drive axle assembly and allowing for a greater choice of materials.

THE PRIOR ART

Medium and heavy truck axle assemblies are generally comprised of an axle housing containing a gear unit engaged to a rotatable power input means such as an input shaft, two axle shafts also engaged to the gear unit, and a wheel hub attached at the end of each axle shaft. Wheel hub cavities are formed by the attachment of each wheel hub to the end of the axle shafts. Each wheel hub cavity encloses lubricant for bearings internal to the wheel hub. Heretofore, a full face gasket was used for sealing between the mounting face on the shaft end flange of the axle and the outer hub mounting face of the wheel hub. There was no metal to metal contact at the mounting faces. The assembly of this joint was time consuming due to the care required for gasket placement during assembly. Haste or lack of care on the part of assembly line workers resulted in tears in the gasket and lubricant leakage where the tears were not discovered for rework. The fact that the seal or gasket was installed where the mating faces of the axle shaft and the wheel hub met limited the choice of materials that could be used to make the seal or gasket. This is because the gasket affected the axle shaft to wheel hub mounting joint. There is a need to eliminate the need for a full face gasket for ease of axle assembly but still provide a seal to prevent lubrication leakage from the wheel hub cavity. To date, however, a sealing ring assembly at the axle shaft of the drive axle of a vehicle having these properties has not been proposed.

SUMMARY OF THE INVENTION

Accordingly, a primary object of the apparatus of the present invention is to provide a sealing ring for the interface between the shaft end flange of the axle and the outer hub mounting face of the wheel hub which allows for metal to metal contact between shaft end flange and the wheel hub mounting faces.

A second object of the invention is to provide a sealing ring for the interface between the axle shaft and wheel hub which is not susceptible to tearing.

A third object of the invention is provide for a sealing ring for the interface between the axle shaft and wheel hub which allows for a wider choice of materials of manufacture.

A fourth object of the invention is to provide a sealing ring which will be compressed between the shaft end flange of the axle and the wheel hub in a recess in the shaft end flange so that the sealing ring will be contained within the recess.

A fifth object of the invention is to provide a sealing ring which will prevent the lubricant found within the wheel hub cavity from leaking out. The dimensions and size of the preferred embodiment of the invention allow for optimum compression of the seal ring into the machined recess in the shaft end flange. This compression greatly enhances the inventions lubricant leak prevention capabilities.

BRIEF DESCRIPTION OF THE DRAWINGS

Other objects and advantages of the invention will become more apparent upon perusal of the detailed description thereof and upon inspection of the drawings in which:

FIG. 7 is a bottom view of a seal ring of the embodiment of the invention shown in FIG. 3.

FIG. 8 is a side view of the seal ring of FIG. 7.

FIG. 9 is a blow up of one edge of the seal ring of FIG. 7.

DESCRIPTION OF THE PREFERRED EMBODIMENT

Figure 1:
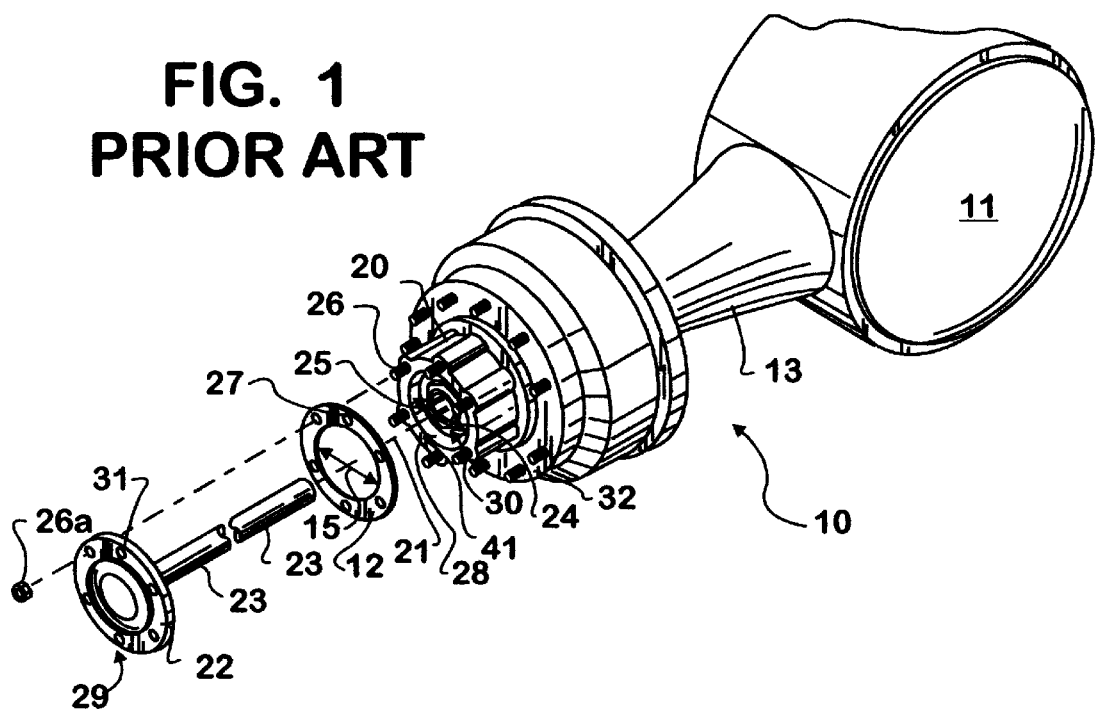
FIG. 1 is an exploded perspective view of one side of a conventional axle assembly including a prior art gasket.
Figure 2:
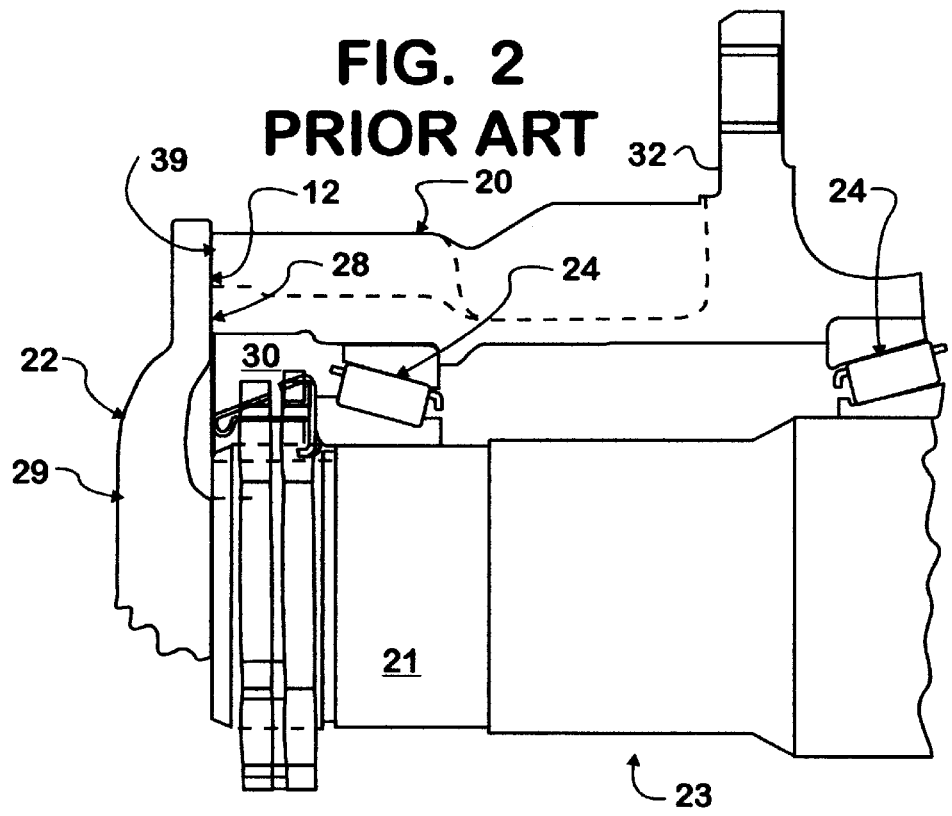
FIG. 2 is a partial cut away drawing of the prior art.

Referring now to the drawings in greater detail there is illustrated, in FIGS. 1 and 2, a rear axle assembly 10 of a vehicle 101 (not shown), including the gasket 12 of the prior-art. The vehicle 101 has an engine 102 (not shown), a transmission 103 (not shown), and a drive train 104 (not shown) with an input drive shaft 105 (not shown) to transfer power from the engine 102 and transmission 103. The axle assembly 10 typically includes a differential housing 11, an axle housing 13, a wheel hub 20, an axle 22, wheel bearings 24 and fastener means 26 for engaging the axle 22 to the wheel hub 20. FIG. 1 shows the left side of an axle assembly 10, with the right side (not shown) being mirror image of the left side, including an axle housing 13, an axle 22 also mounted to a differential housing 11. A gear unit 14 (not shown) is enclosed in the differential housing 11 and engaged to the drive shaft 105 and a axle shaft portion 23 of the axle 22. The axle assembly 10 is sometimes referred to as a 'floating axle assembly' because the axle 22 is removable from the wheel hub 20. Each axle assembly 10 has two axles 22. Each axle 22 has a shaft end flange 29 on the on an end of the portion of the axle 22 which protrudes from the axle housing 13. The shaft end flanges 29 each have a shaft inner mounting face 39 and stud holes 31 for the fastener means 26 to pass through. The wheel hub 20 has an axis of rotation 21, an inner diameter 25, an outer hub mounting face 28, a cavity 30, an inner face 32, and an inner radial wall 41 within the cavity 30. A rim and tire assembly 106 (not shown) are typically mounted to the inner face 32 of the wheel hub 20. The body of the vehicle 101 (not shown) is typically mounted to the axle housing 13. The wheel bearings 24 require a lubricant 15 (not shown) to reduce friction in the wheel bearings 24 and to transfer heat from the wheel bearings 24 during vehicle 10 operation. In order to seal the lubricant 15 inside the cavity 30 of the wheel hub 20, the gasket 12 is mounted between the outer hub mounting face 28 and shaft inner mounting face 39 of the shaft end flange 29 of the axle 22. The prior art gasket 12 was mounted so there was no metal to metal contact between the shaft inner mounting face 39 and the outer hub mounting face 28 of the wheel hub 20. Studs comprise the fastener means 26 and pass through gasket holes 27 in the prior art gasket 12 and stud holes 31 in the shaft end flange with nuts 26a holding the axle 22 to the wheel hub 20. The gasket holes 27 and stud holes 31 are arranged in a circular pattern about the axis of rotation 21 when installed.

Figure 3:
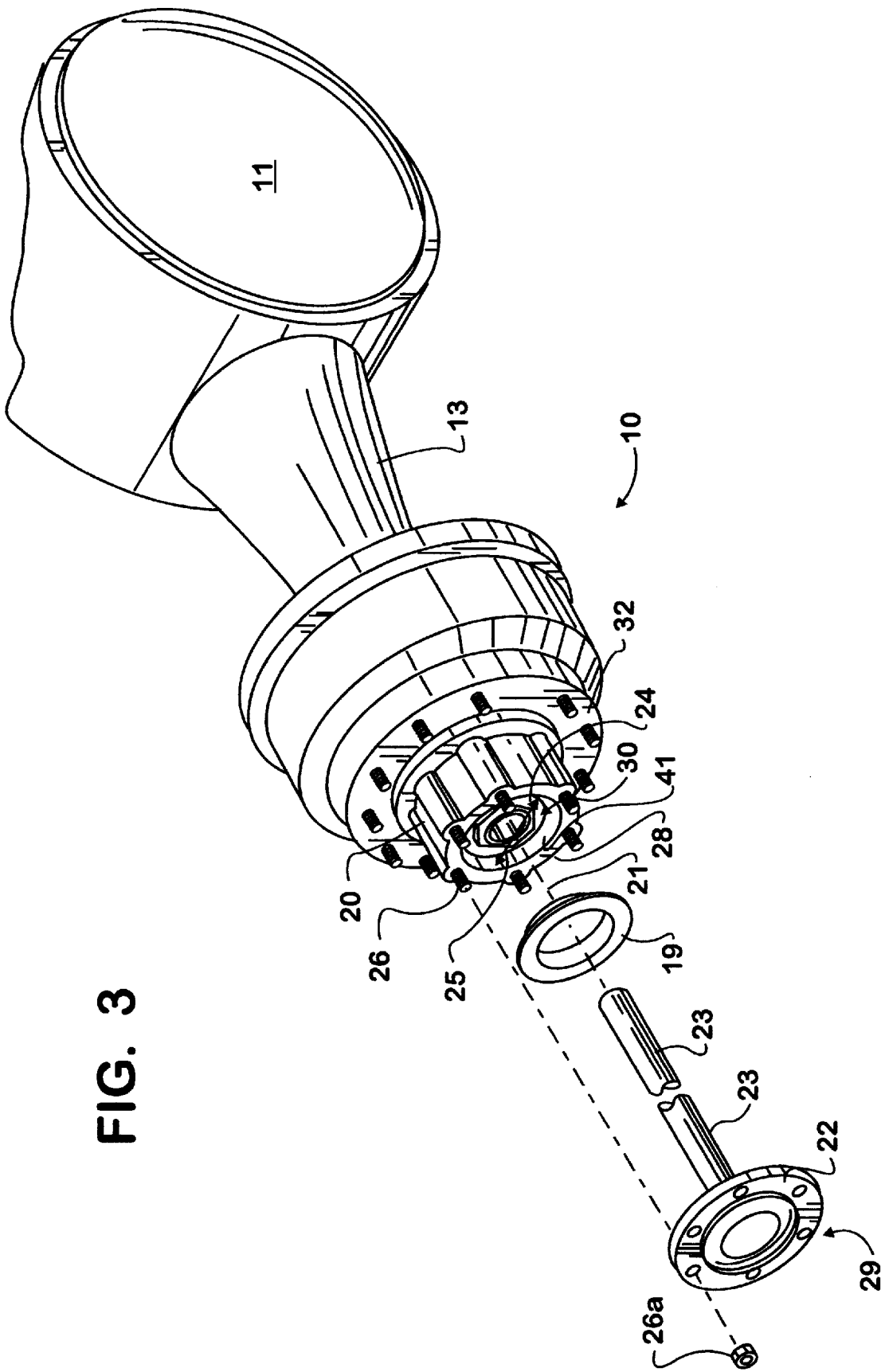
FIG. 3 is an exploded perspective view of one side of an axle assembly including one embodiment of the invention.
Figure 4:
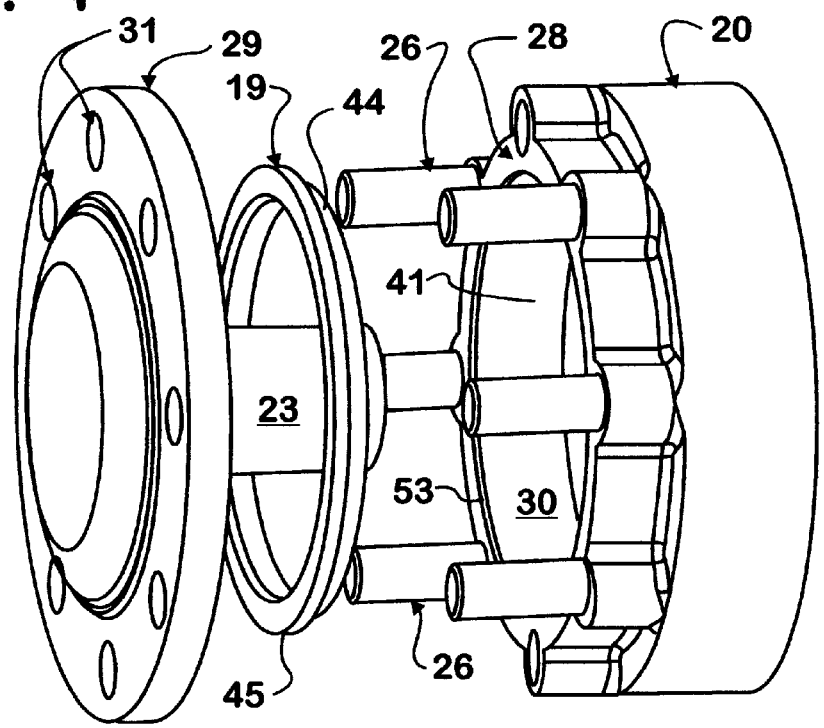
FIG. 4 is a partial disassembled view of the embodiment of the invention shown in FIG. 3 looking into a wheel hub mounting face.
Figure 5:
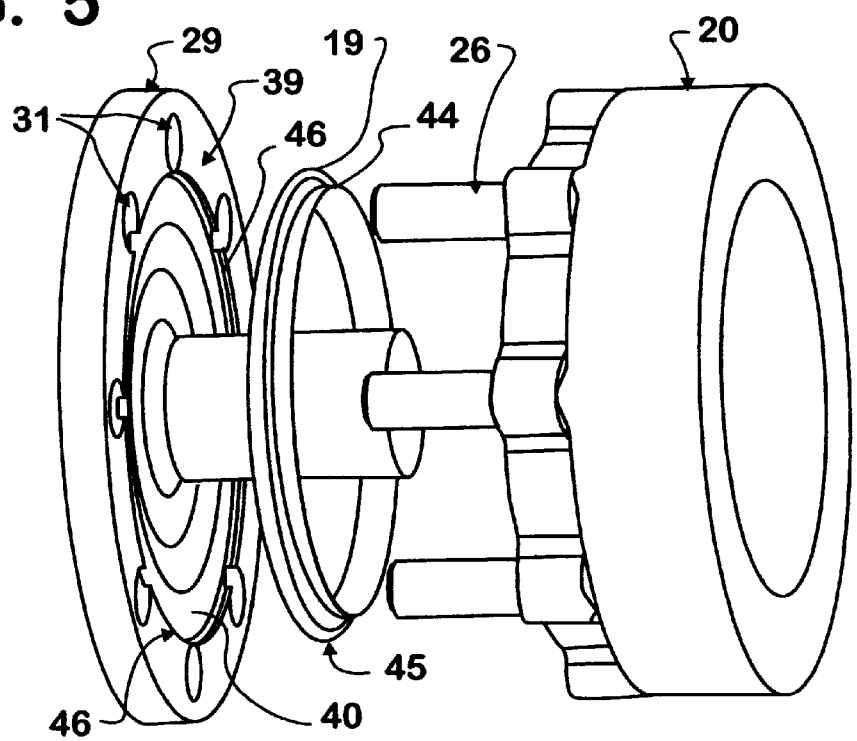
FIG. 5 is a partial disassembled view of the embodiment of the invention shown in FIG. 3 looking into axle shaft mounting face.
Figure 6:
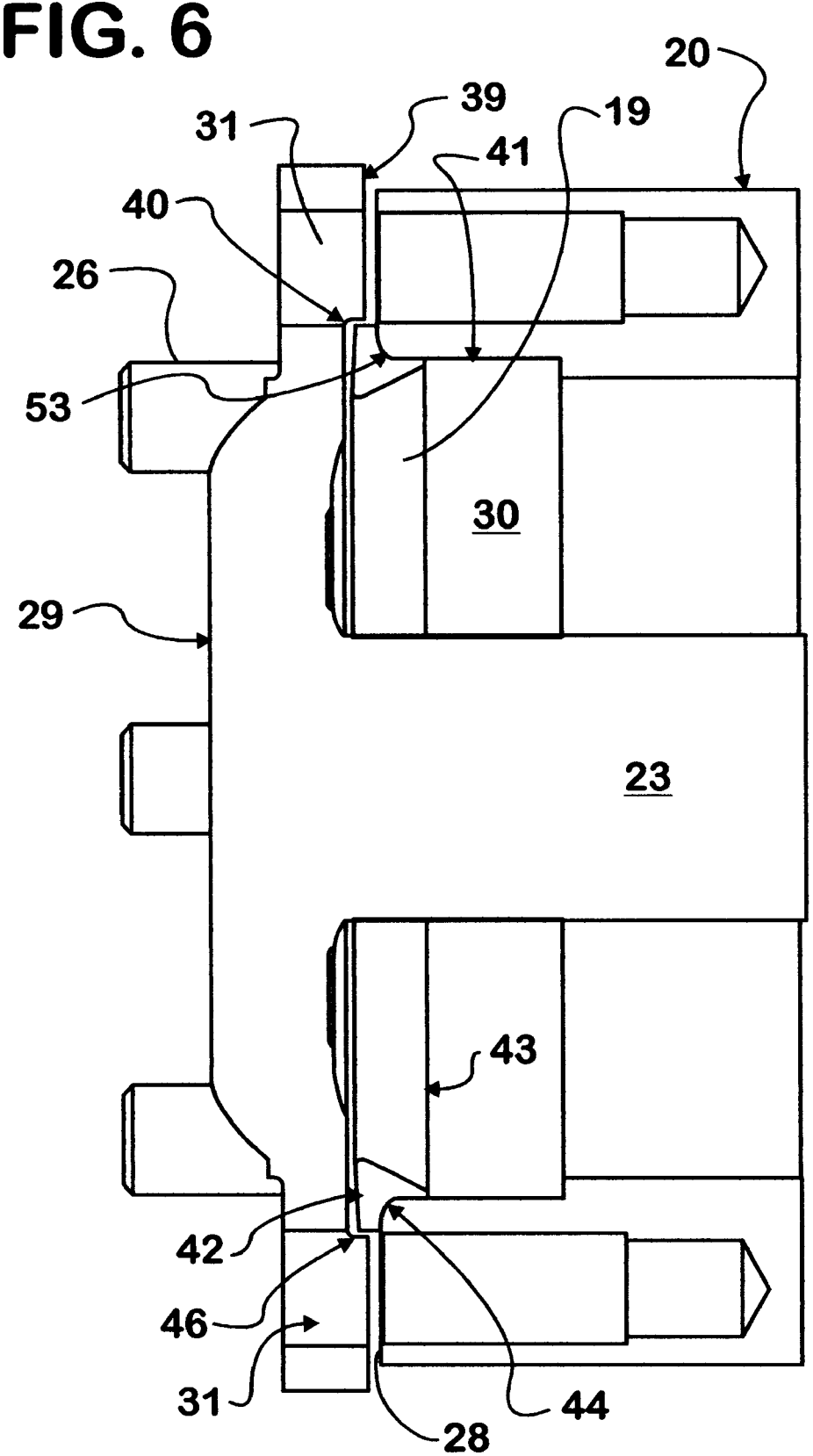
FIG. 6 is a cut away side view of the embodiment of the invention shown in FIG. 3.

The preferred embodiment of this invention is shown in FIGS. 3 to 9. FIG. 3 shows a similar view as FIG. 1. The number designations and titles of the components shown in FIGS. 3 to 9 are similar to that of in FIGS. 1 and 2 except as to the details of the invention described here. Each shaft inner mounting face 39 on the shaft end flanges 29 has circular recess 40. In the preferred embodiment an outer edge 46 of the circular recess 40 corresponds to the inner edge of the stud holes 31 in the shaft end flange 29. A circular sealing ring 19 is used instead of the gasket 12 of the prior art. The circular sealing ring 19 has no equivalent part to the gasket holes 27 of the prior art gasket 12. Each circular sealing ring 19 has a shaft side 42 which is inserted into the circular recess 40 of the shaft inner mounting face 39 and a hub side 43 inserted into the cavity 30 of the wheel hub 20 with a hub side outer wall 44 being adjacent to the inner radial wall 41 of the wheel hub 20. The shaft side 42 of the circular sealing ring 19 has a shaft side outer wall 45 which when installed is adjacent to the outer edge 46 of the circular recess 40. This allows a metal to metal contact between the shaft inner mounting face 39 of the shaft end flange 29 of the axle 22 and the hub mounting face 28 of the wheel hub 20. The shaft side outer wall 45 is of a greater diameter than the hub side outer wall 44 allowing the circular sealing ring 19 to be held in place at a wheel hub inner edge 53 where the hub mounting face 28 meets the inner radial wall 41 of the wheel hub 20. In this mounting location the circular sealing ring 19 protects against lubricant 15 leakage from the cavity 30 of the wheel hub 20.

In the preferred embodiment, prior to installation the shaft side outer wall 45 of the circular sealing ring 19 is has a diameter slightly less than the diameter of the outer edge 46 of the circular recess 40. During tightening of the nuts 26a onto the fastener means 26, the shaft side 42 will compress axially causing the shaft side outer wall to expand out radially to the outer edge 46 of the circular recess 40 of the shaft end flange 29. This results in enhanced sealing of the lubricant 15 in the cavity 30 of the wheel hub 20.

A feature of the preferred embodiment is that prior to installation, a shaft side outer face 47 of the shaft side 42 of the circular sealing ring 19 extends upwards at a set angle of inclination 48 from the shaft side outer wall 45 to an inner edge 49 of the circular sealing ring 19. This angle of inclination 48 is preferably between and including three (3) and four (4) degrees relative to a perpendicular imaginary line 50 which is perpendicular to the hub side outer wall 44. The inner edge 49 of the circular sealing ring 19 may narrow at a set angle of narrowing 51 from the shaft side outer face 47 to and through the hub side 43 of the circular sealing ring 19. This angle of narrowing 51 is preferably between twenty five (25) and twenty seven (27) degrees with an optimum angle of twenty six (26) degrees relative to a parallel imaginary line 52 which is parallel to the hub side outer wall 44. The wheel hub inner edge 53 where the hub mounting face 28 meets the inner radial wall 41 of the wheel hub 20 is rounded. The circular sealing ring 19 has a curved fulcrum surface 54 at the transition between the hub side outer wall 44 and the shaft side outer wall 45. During installation of the nuts 26a, the angle of narrowing 51 of the inner edge 49 and the angle of inclination of 48 of the shaft side outer face 47 allow the circular sealing ring 19 to mate tightly where the curved fulcrum surface 54 meets the wheel hub inner edge 53. This results in enhanced lubricant 15 leakage protection of the circular sealing ring 19.

The circular sealing ring 19 may be made of a rubber which is both durable and pliable. These properties are important as it is expected the axle assembly 10 might reasonably need to be disassembled five or six times over its lifetime with the circular sealing ring 19 being reused. Two rubbers appropriate for use are Hydrin Rubber #2700 and Nitrile Rubber #1215, both manufactured by Hawkeye Rubber Manufacturing Company. The Nitrile Rubber retains its pliability over a wide range of temperatures (−60 degrees Fahrenheit to 230 degrees Fahrenheit) and as such provides all weather durability. Neoprene rubber is also an appropriate material for manufacture of the circular sealing ring 19 due to it having the desired durability and pliability.

As described above the axle assembly 10 and the circular sealing ring 19 of the present invention provide a number of advantages, some of which have been described above, and others of which are inherent in the invention. Also, modifications may be proposed to the axle assembly 10 and the circular sealing ring 19 without departing from the teachings herein. Accordingly, the scope of the invention is only to be limited as necessitated by the accompanying claims.

What is claimed is:

1. An axle assembly for use in a vehicle with an engine, a transmission, and a drive train with an input drive shaft to transfer power from the engine and transmission, comprising:

(a) an axle housing;

(b) a gear unit located within said housing and engageable to the input drive shaft;

(c) two axles, with each axle being separately engaged to said gear unit;

(d) each axle having a shaft end flange on an end of a portion of said axle protruding from said axle housing;

(e) a shaft inner mounting face on each of said shaft end flanges;

(f) each said shaft inner mounting face having a circular recess and stud holes through said shaft inner mounting face and said shaft end flange;

(g) two wheel hubs, each having an outer hub mounting face corresponding to one of said shaft inner mounting faces;

(h) two circular sealing rings each having a shaft side inserted into said circular recess of one of said shaft inner mounting faces and a hub side inserted into one of said wheel hubs with an outer wall of said hub side of said sealing ring being adjacent to an inner radial wall of said wheel hub, said sealing rings being sized to allow direct contact between said shaft inner mounting faces and said outer hub mounting faces;

(i) studs installed in said wheel hubs and passing through said stud holes in said shaft inner mounting faces and said shaft end flanges with nuts to hold said wheel hubs on said axles, (j) prior to installation a shaft side outer wall of said shaft sides of each of said sealing rings has an outer diameter slighty less than an inner diameter of an outer edge of said circular recess of said shaft inner mounting faces;

(k) said outer diameter of said shaft side outer wall of said sealing rings is greater than an outer diameter of said hub side outer wall of said sealing rings; and (l) prior to installation a shaft side outer face of said shaft side of said sealing rings extends slightly upwards at a set angle of inclination from said shaft side outer walls of said sealing rings to an inner edge of said sealing rings.

2. At The axle assembly of claim 1, wherein:
   (a) said angle of inclination of said shaft side outer face of said shaft side of said sealing rings is between and including three degrees and four degrees relative to an imaginary line perpendicular to said hub side outer wall.
3. The axle assembly of claim 2, wherein:
   (a) said inner edge of said sealing rings narrows at a set angle of narrowing from said shaft side outer face of said shaft side of said sealing rings to and through said hub side of said sealing rings.
4. The axle assembly of claim 3, wherein:
   (a) said angle of narrowing of said inner edge of said sealing rings is between twenty five and twenty seven degrees relative to an imaginary line parallel to said hub side outer wall.
5. The axle assembly of claim 4, wherein:
   (a) said angle of narrowing of said inner edge of said sealing rings is twenty six degrees relative to said imaginary line parallel to said hub side outer wall.
6. The axle assembly of claim 5, wherein:
   (a) a wheel hub inner edge of said wheel hub is curved where said outer hub mounting faces meet said inner radial walls of said wheel hubs; and
   (b) a curved fulcrum is the transition between said shaft side outer walls of said sealing rings and said hub side outer walls of said sealing rings.
7. The axle assembly of claim 6, wherein:
   (a) said stud holes in said shaft end flanges are arranged in a circular pattern; and
   (b) said outer edge of said circular recess in said shaft inner mounting face is at a tangent to an inner most portion of said stud holes.
8. The axle assembly of claim 6, wherein:
   (a) said circular sealing ring is mat of a Hydrin Rubber.
9. The axle assembly of claim 6, wherein:
   (a) said circular sealing ring is made of a Nitrile Rubber.
10. The axle assembly of claim 6, wherein:
    (a) said circular sealing ring is made of a Neoprene Rubber.

\* \* \* \* \*